J. C. KISTLER.
CLOVER HULLER.
APPLICATION FILED JUNE 23, 1913.

1,123,312.

Patented Jan. 5, 1915.
2 SHEETS—SHEET 1.

WITNESSES
Howard D. Orr.
H. T. Riley

John C. Kistler, INVENTOR,
BY E. G. Siggers
ATTORNEY

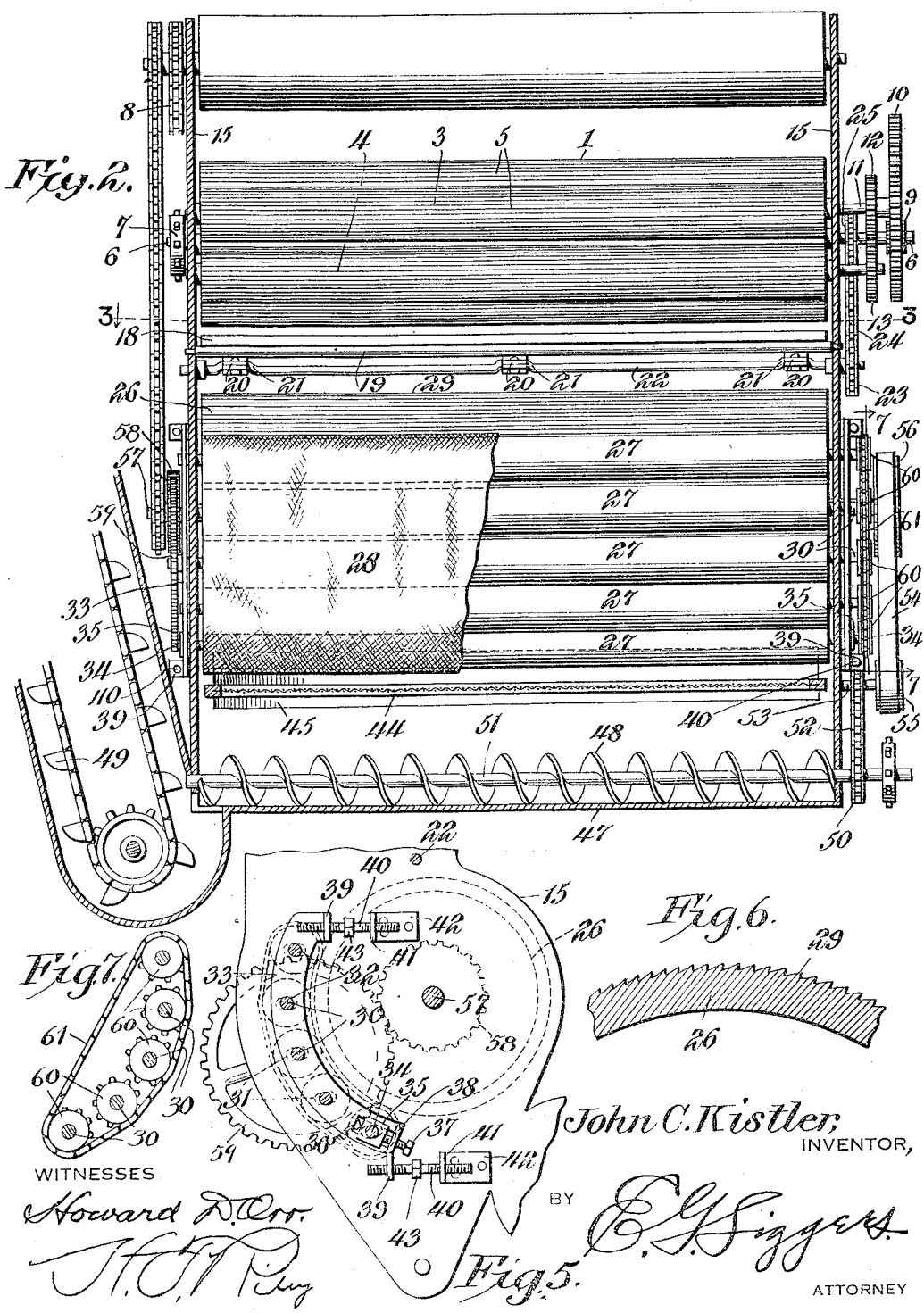

UNITED STATES PATENT OFFICE.

JOHN C. KISTLER, OF CLINTON, MISSOURI.

CLOVER-HULLER.

1,123,312.  Specification of Letters Patent.  Patented Jan. 5, 1915.

Application filed June 23, 1913. Serial No. 775,383.

*To all whom it may concern:*

Be it known that I, JOHN C. KISTLER, a citizen of the United States, residing at Clinton, in the county of Henry and State of Missouri, have invented a new and useful Clover-Huller, of which the following is a specification.

The invention relates to improvements in clover hullers.

The object of the present invention is to improve the construction of clover hullers for harvesting machines of the type shown and described in Patent No. 934,406, granted to me Sept. 14, 1909, more especially the construction of the means for masticating or grinding the clover heads, the shaking screen for separating the heads, straw and other coarse matter from the seeds and chaff, and the hulling mechanism for cleaning the seed and removing the impurities therefrom.

A further object of the invention is to provide adjustable hulling mechanism capable of being arranged to adapt the machine for hulling or threshing timothy, red top and blue grass clover, millet, oats, rye, barley and wheat, and equipped with means for presenting a continuous yieldable moving concave surface to the hulling cylinder to prevent breaking of the seed.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
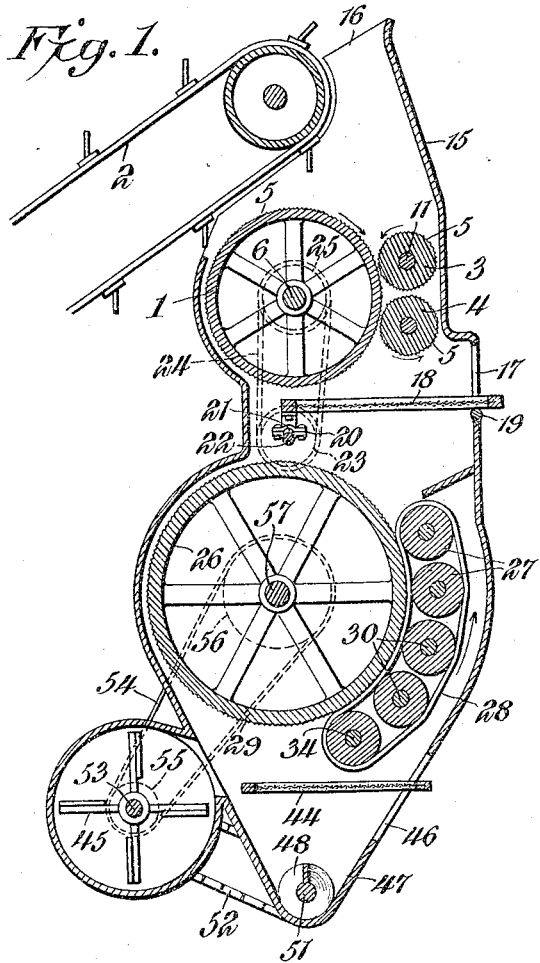
Figure 3:
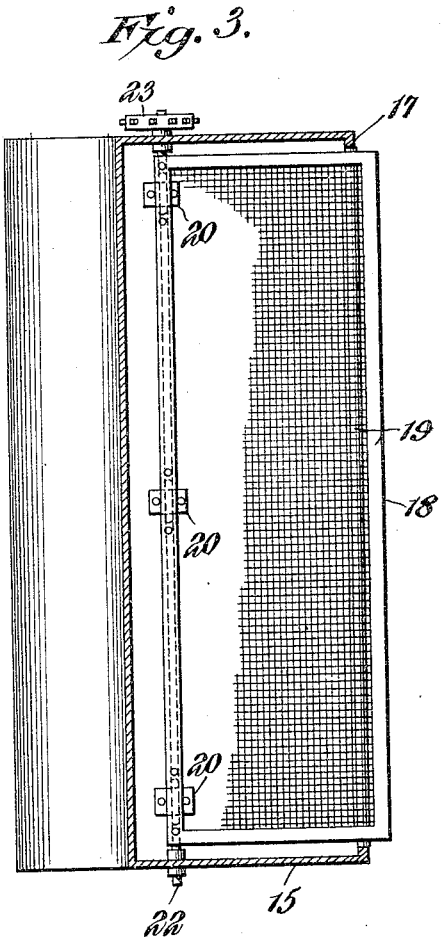
Figure 4:
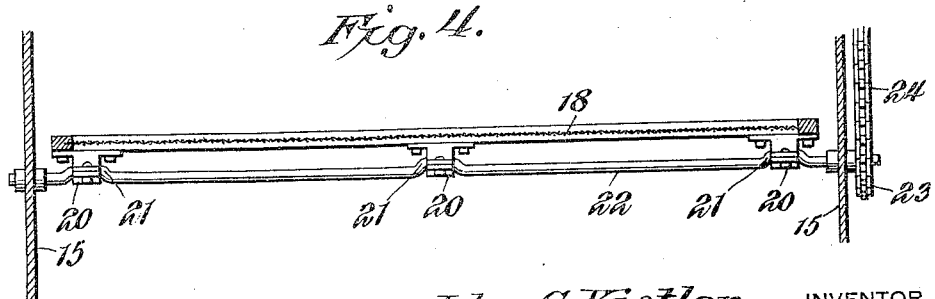

In the drawings: Figure 1 is a vertical longitudinal sectional view of a portion of a clover huller, constructed in accordance with this invention. Fig. 2 is a transverse sectional view of the same. Fig. 3 is a horizontal sectional view on the line 3—3 of Fig. 2. Fig. 4 is a detail transverse sectional view, illustrating the construction for actuating the shaking screen. Fig. 5 is a detail elevation, illustrating the manner of adjustably mounting the moving concave. Fig. 6 is an enlarged detail sectional view of a portion of one of the threshing or masticating cylinders, illustrating the construction of its peripheral engaging face. Fig. 7 is a detail sectional view on the line 7—7 of Fig. 2, showing the sprocket gearing for rotating the rolls of the moving concave.

Like numerals of reference designate corresponding parts in all the figures of the drawings.

In the accompanying drawings in which is illustrated the preferred embodiment of the invention, 1 designates a relatively large threshing or masticating cylinder, supported below the delivery end of an inclined endless carrier 2 and coöperating with a pair of upper and lower relatively small threshing or masticating cylinders 3 and 4, located adjacent to the rear portion of the periphery of the relatively large threshing or masticating cylinder 1, so that the clover heads will be operated on successively by the upper and lower cylinders 3 and 4, whereby a thorough threshing or mastication of the said clover heads will be effected. The cylinders 1, 3 and 4 are each provided with a rough or rasp-like surface 5, as set forth in the said patent, and the said threshing or masticating cylinders rotate in the direction of the arrows in Fig. 1 of the drawings, and their contiguous portions travel downwardly in the same direction but move at different speeds, the large cylinder rotating at a much higher speed than the small cylinders. Any relative speed may be obtained by varying the diameter of the gears hereinafter described for actuating the said cylinders.

The relatively large cylinder 1 is mounted on a horizontal shaft 6, carrying at one end a sprocket wheel 7 designed to mesh with and be driven by a sprocket chain 8, which operates the inclined endless carrier 2 in the manner shown and described in the aforesaid patent. Any other suitable gearing, however, may be employed for rotating the relatively large cylinder. The shaft 6 has keyed or otherwise fixed to its other end a pinion 9 meshing with a relatively large gear 10, secured to the shaft 11 of the upper relatively small cylinder 3, and motion is transmitted from the upper cylinder 3 to the lower cylinder 4 by gears 12 and 13 of a uniform diameter, whereby the upper and lower cylinders 3 and 4 rotate at a uniform speed. The pinion 9 of the relatively large cylinder 1 and the gear wheel 10 of the upper relatively small cylinder 3 provide for driving the large cylinder 1 at a higher speed than the small cylinders 3 and 4, but any other form of gearing may be employed for accomplishing this result, and in practice the cylinders will be adjustable toward and from each other to secure the desired engagement with the clover heads or other material operated on. The material after passing between the large cylinder and the upper and lower small cylinders will be ground or masticated in such manner that the seeds and chaff will become thoroughly separated from the heads, straw and other coarse material.

The threshing cylinders are mounted within a substantially vertical casing 15, constructed of sheet metal or other suitable material and having an open top 16 located at the discharge end of the inclined endless carrier 2. In the drawings, the casing is shown extending entirely across the rear end of the clover huller, and the threshing cylinders occupy the upper portion of the casing, the lower portion of which accommodates the hulling mechanism hereinafter described. The casing is provided at the intermediate portion of its rear wall with a discharge opening 17 through which projects a shaking screen 18, disposed in an approximately horizontal position below the threshing cylinders and adapted to receive the material after it has been operated on by the same. The shaking screen, which may be constructed of any suitable material, is provided with openings of a size to permit the clover seed and chaff to pass through the screen while the heads, straw and other coarse material is discharged by the screen through the said opening 17 in the rear wall of the casing. The screen 18, which has its rear portion loosely supported upon a transverse rod 19 at the bottom of the opening 17, is provided at its front portion with boxes or bearings 20 depending from the screen and receiving cranks 21 of a transversely disposed shaft 22; whereby when the shaft is rotated, the screen will follow the movements of the cranks and an up and down as well as a back and forth movement will be imparted to the screen, causing the front portion thereof to travel in a circular path, while the rear portion slides over the supporting rod 19 and has a rocking movement thereon. The movements imparted to the shaking screen enables a thorough separation of the values from the heads and straw to be effected. The crank shaft, which actuates the screen 18, may be rotated in either direction, and when rotated in the same direction as the traction wheels of the machine, the screen will not discharge the coarse material as rapidly as when the crank shaft is rotated in the opposite direction. The boxes or bearings 20, which are rigid with the front portion of the shaking screen, are preferably arranged at the center and ends thereof, as illustrated in Fig. 3 of the drawings. Mounted on one end of the crank shaft is a sprocket wheel 23 receiving a sprocket chain 24, which extends to and meshes with a sprocket wheel 25 fixed to the shaft 6 of the large cylinder adjacent to the gearing for imparting motion from the large cylinder to the small cylinders.

The hulling mechanism, which is shown coextensive in length with the threshing cylinders owing to its particular arrangement with relation to the latter, may be constructed of any preferred length to secure the desired amount of hulling surface. The hulling mechanism comprises in its construction a relatively large hulling cylinder 26 and a moving concave composed of a series of small cylinders or rolls 27, and a flexible traveling belt or apron 28, arranged on and actuated by the said rolls 27. The hulling cylinder 26 is provided with an engaging face 29 formed by cutting the periphery of the cylinder in a longitudinal direction at a slight angle, say ten degrees to the radii of the same and raising longitudinal burs or teeth, as clearly illustrated in Fig. 6 of the drawings, for engaging the seed. In practice, there will be about twenty of the said teeth or burs of the engaging face to an inch, but their size and number may, of course, be varied. The traveling belt or apron of the moving concave, which is designed to be constructed of leather, rubber, canvas, or other pliable and yieldable material, presents a continuous flexible yielding moving concave surface to the convex surface of the hulling cylinder and is adapted to prevent the breaking of the seed or grains in the process of hulling the same. The endless belt or apron in practice will have its ends united by lacing or other suitable means, and will be drawn tightly around the rolls or cylinders of the moving concave forming an endless covering therefor and constituting a continuous moving surface for the same adapted to have its tension adjusted by the means hereinafter described. The continuous concave face of the traveling belt or apron and the adjacent or contiguous portion of the hulling cylinder move in the same direction, but at different rates of speed. Either the gearing shown and described in the aforesaid patent, as hereinafter fully described or any other suitable gearing may be employed for actuating the rolls or cylinders.

The small rolls or cylinders 27, with the exception of the lowermost one, are mounted on shafts 30 having their terminals extended through slots 31 of the side walls of the casing 15 and arranged in bearing openings 32 of adjustable frames 33. The shaft 34 of the lower end roll or cylinder is mounted in adjustable bearings 35 slidable in slots 36 in the lower ends of the adjustable frames and connected with adjusting screws 37, which are adapted to stretch the traveling belt or apron to the desired tension by adjusting the lower end roll or cylinder. The screws 37, which are mounted in threaded openings of terminal flanges 38 of the adjustable frames, are suitably connected with the slidable bearings. Either or both end rolls or cylinders of the moving concave may, of course, be adjustably mounted in the manner shown. The adjustable frames are also provided at their upper and lower ends with projecting lugs or flanges 39 receiving one end of right and left hand threaded screws 40, which also engage threaded openings of fixed lugs or flanges 41 of the casing 15. The lugs or flanges 41 are preferably formed integral with attaching plates 42, which are riveted or otherwise secured to the outer faces of the side walls of the casing 15. The right and left hand threaded screws are provided with central polygonal wrench receiving portions 43 to enable the screws to be readily rotated by a wrench or similar tool to move the concave toward and from the moving cylinder to adjust the hulling mechanism to enable it to operate on various kinds of seed.

The casing contains a sieve or riddle 44 onto which the seeds and hulls are dropped as they pass between the hulling cylinder and the moving concave. The seeds passing through the riddle 44 are exposed to the blast from a fan 45, arranged at the front of the lower portion of the casing 15 and serving to discharge the hulls and chaff through an opening 46 in the rear wall of the said casing 15. The clean seed drop into a trough 47 formed by the lower portion of the casing 15 and receiving a screw conveyer 48 for delivering the seed to an elevator 49 at the upper end of which the seed is discharged into a suitably supported bag or receptacle (not shown), as explained in the aforesaid patent. A sprocket wheel 50 is secured to one end of the shaft 51 of the screw conveyer, which is driven by a sprocket chain 52, extending from the screw conveyer to the fan shaft 53. The fan is designed to be driven by a belt 54 arranged on pulleys 55 and 56, mounted, respectively, on the fan shaft 53 and the shaft 57 of the hulling cylinder, as set forth in the said patent, but the gearing for operating the fan and the conveyer may be arranged in any other suitable manner. The riddle 44, as explained in the said patent, is designed to be hung in such manner as to enable it to be vibrated by an eccentric or other suitable actuating means. The shaft 57 of the hulling cylinder carries a pinion 58, which meshes with a relatively large gear 59 mounted on one end of the shaft of the central one of the series of rolls 27. This will cause the concave face of the traveling belt or apron 28 and the adjacent portions of the hulling cylinder to move in the same direction at different speeds. The rolls 27 are simultaneously rotated by sprocket gearing consisting of sprocket pinions 60 fixed to the shafts of the rolls 27 and a sprocket chain 61 arranged on and meshing with each of the sprocket wheels 60.

What is claimed is:—

1. A harvesting machine including an inclined conveyer extending downwardly and forwardly from the back of the machine and adapted to carry the severed clover heads upwardly and rearwardly, a transversely disposed casing extending across the back of the machine and having an open top arranged beneath the upper end of the conveyer, said casing being of a width substantially coextensive with the said conveyer and adapted to receive the clover heads therefrom, threshing mechanism mounted within the upper portion of the casing, and hulling mechanism located within the lower portion of the casing, said threshing and hulling mechanism being substantially coextensive with the width of the conveyer.

2. A harvesting machine including an inclined conveyer extending downwardly and forwardly from the back of the machine and adapted to carry the severed clover heads upwardly and rearwardly, a transverse casing extending across the back of the machine and having an open top arranged beneath the upper end of the conveyer, said casing being of a width substantially coextensive with the conveyer, threshing mechanism mounted within the upper portion of the casing and comprising a relatively large front cylinder located under the conveyer, and a pair of rear relatively small upper and lower rear cylinders arranged adjacent to the large cylinder and adapted to coöperate therewith to operate successively on the material, and hulling mechanism located within the lower portion of the casing.

3. A harvesting machine including an inclined conveyer extending downwardly and forwardly from the rear portion of the machine and adapted to carry the severed clover heads upwardly, an approximately vertical transversely disposed casing extending across the back of the machine and having an open top arranged beneath the upper end of the conveyer to receive the severed clover heads, said casing being substantially coextensive in width with the conveyer, threshing mechanism mounted within the upper portion of the casing, hulling mechanism arranged within the lower portion of the casing, said threshing and hulling mechanism being coextensive with the conveyer and the said casing being provided at an intermediate point between the threshing and the hulling mechanism with a rear discharge opening, and a vibratory screen mounted in the casing at the said discharge opening and extending across the casing for separating the coarse material from the seeds and chaff.

4. A harvesting machine including an inclined conveyer extending downwardly and forwardly from the back of the machine and adapted to carry severed clover heads upwardly, an approximately vertically disposed transverse casing extending across the back of the machine and having an open top arranged to receive material from the conveyer, threshing mechanism mounted within the upper portion of the casing, the latter being provided below the threshing mechanism with a discharge opening, an approximately horizontal screen located within and extending across the casing and having its rear portion loosely extending through the discharge opening and supported at the bottom thereof, a rotary crank element directly connected with the front portion of the screen to cause the same to move upwardly and downwardly and backwardly and forwardly, and hulling mechanism located within the lower portion of the casing.

5. A harvesting machine including an inclined conveyer extending downwardly and forwardly from the back of the machine, an approximately vertically disposed transverse casing extending across the back of the machine and arranged to receive severed clover heads from the conveyer and provided at the back with a discharge opening located at an intermediate point between the top and bottom of the casing, threshing mechanism mounted within the casing above the discharge opening, an approximately horizontal screen arranged within and extending across the casing and having its rear portion extending through and loosely supported at the discharge opening, and a rotary crank element connected directly with the front portion of the screen and adapted to move the same upwardly and downwardly and backwardly and forwardly to cause the front portion of the screen to travel in substantially a circular path and to produce a reciprocatory rocking action at the rear portion of the screen.

6. A machine of the class described provided with a hulling cylinder and a moving concave comprising a traveling belt or apron consisting of a sheet of flexible material presenting a continuous moving concave face to the hulling cylinder, and a curved series of rolls receiving the traveling belt or apron and supporting the said concave face at intervals and maintaining the same in contact with the hulling cylinder.

7. A machine of the class described provided with hulling mechanism including a hulling cylinder having an engaging face and a moving concave comprising a curved series of rolls and a traveling belt or apron consisting of a sheet of flexible material arranged on and covering the rolls of the concave and presenting to the hulling cylinder a continuous yieldable concave face, which is supported at intervals by the said series of rolls, and means for moving said concave face and the adjacent portions of the cylinder in the same direction at different speeds.

8. A machine of the class described including a casing, hulling mechanism mounted within the casing and comprising a hulling cylinder, a curved series of rolls, a traveling belt or apron consisting of a sheet of flexible material covering the said rolls and supported at intervals by the same, and means located exteriorly of the casing for adjusting the end roll of the series to stretch the belt or apron.

9. A machine of the class described provided with hulling mechanism including a casing, a hulling cylinder, a moving concave coacting with the hulling cylinder and having a frame located exteriorly of the casing and provided with spaced lugs, fixed lugs mounted exteriorly of the casing in spaced relation with the said lugs, and right and left hand screws arranged in parallelism and having a threaded connection with the said lugs and adapted to adjust the concave toward and from the hulling cylinder.

10. A machine of the class described including an inclined endless carrier, a substantially vertical casing located beneath and extending across the endless carrier and adapted to receive material therefrom, said casing being provided with upper and lower discharge openings and having its bottom formed with a trough, threshing mechanism mounted within and extending across the upper portion of the casing above the upper discharge opening, hulling mechanism arranged within and extending across the lower portion of the casing, a screen mounted between the threshing mechanism and the hulling mechanism and operating at the upper opening of the casing, a riddle arranged at the lower opening of the casing, a fan extending across the casing at the front thereof and discharging into the same below the riddle, and a conveyer operating in the trough at the bottom of the casing.

In testimony, that I claim the foregoing as my own, I have hereto affixed my signature in the presence of two witnesses.

JOHN C. KISTLER.

Witnesses:
J. B. REDFORD,
H. L. DUNNING.

Copies of this trade-mark may be obtained for five cents each, by addressing the "Commissioner of Patents, Washington, D. C."